US008322383B2

(12) United States Patent
Song et al.

(10) Patent No.: US 8,322,383 B2
(45) Date of Patent: Dec. 4, 2012

(54) CYLINDER PREPARATION FOR HIGH PURITY ACETYLENE

(75) Inventors: Xuemei Song, Grand Island, NY (US); Lloyd Anthony Brown, E. Amherst, NY (US); Thomas Thompson, Grand Island, NY (US); David C. Johnson, Cheektowaga, NY (US)

(73) Assignee: Praxair Technology, Inc., Danbury, CT (US)

( * ) Notice: Subject to any disclaimer, the term of this patent is extended or adjusted under 35 U.S.C. 154(b) by 703 days.

(21) Appl. No.: 12/472,420

(22) Filed: May 27, 2009

(65) Prior Publication Data

US 2010/0300578 A1 Dec. 2, 2010

(51) Int. Cl.
*B65B 31/00* (2006.01)
*B67C 3/00* (2006.01)

(52) U.S. Cl. .................... 141/5; 141/8; 141/66; 141/92; 210/650; 210/748.12; 585/820

(58) Field of Classification Search .................. 141/3, 5, 141/8, 66, 85, 89, 92; 585/809, 820; 210/748.12, 210/650
See application file for complete search history.

(56) References Cited

U.S. PATENT DOCUMENTS

| 4,349,463 | A | 9/1982 | Flanigen |
| 4,582,100 | A | 4/1986 | Poulsen |
| 4,657,055 | A | 4/1987 | Poulsen |
| 4,863,493 | A * | 9/1989 | Kotani et al. ..................... 95/14 |
| 5,284,630 | A | 2/1994 | Bunger et al. |
| 6,006,797 | A * | 12/1999 | Bulow et al. ...................... 141/3 |
| 6,365,792 | B1 * | 4/2002 | Stapf et al. .................... 585/539 |
| 2005/0016831 | A1 | 1/2005 | Paganessi et al. |
| 2009/0182180 | A1 * | 7/2009 | Huang et al. ..................... 585/16 |

OTHER PUBLICATIONS

Author Unknown, "Acetylene Cylinders", *American Welding Society*, Miami, FL, US, vol. 77, No. 1, Jan. 1, 1998, p. 66.

* cited by examiner

*Primary Examiner* — Dinh Q Nguyen
(74) *Attorney, Agent, or Firm* — Nilay S. Dalal (57) ABSTRACT

This invention relates in part to a method for preparing a pressure vessel for receiving high purity acetylene at elevated pressure. The method involves providing a porous filler-containing pressure vessel, deep cleaning the porous filler-containing pressure vessel, purifying a solvent, and charging the purified solvent into the deep cleaned, porous filler-containing pressure vessel. The pressure vessel is then charged with high purity acetylene for storage, transport and/or delivery of the high purity acetylene. The high purity acetylene may be useful as a source material for depositing carbon and carbon-containing films in semiconductor applications.

13 Claims, 5 Drawing Sheets

CYLINDER PREPARATION FOR HIGH PURITY ACETYLENE

FIELD OF THE INVENTION

This invention relates to cylinder preparation for storage, transport and/or delivery of high purity acetylene. The high purity acetylene may be useful as a source material for depositing carbon and carbon-containing films in semiconductor applications.

BACKGROUND OF THE INVENTION

Acetylene can decompose explosively (i.e., decompose into carbon and hydrogen) under conditions of high pressure and temperature, even in the absence of air or oxygen. Therefore, acetylene cylinders are constructed uniquely. Each cylinder contains porous filler with solvent such as acetone, dimethylformamide (DMF) or N-methylpyrrolidone (NMP) distributed throughout the filler. The filler is a porous mass generally having a porosity of around 90% by volume. The function of the porous filler is to separate acetylene into small units in the pores that help to inhibit the decomposition of acetylene. The function of the solvent is to absorb large amounts of acetylene at relatively low pressures to enable high cylinder loading in low pressure cylinders.

Due to their unique construction, the preparation of acetylene cylinders for high purity acetylene is a challenge. For example, with regard to the porous filler material, impurity gases such as nitrogen, oxygen and carbon dioxide can be trapped inside the pores during the formation of the porous mass and during subsequent cylinder leak testing with air or nitrogen. Typically, acetylene cylinders will be vacuumed down to around 24 inch Hg to remove the majority of air impurities prior to solvent charging. In conventional techniques, solvent is then charged directly into the cylinder without any prior degassing step. Dissolved gases, such as nitrogen, oxygen and the like, are at a level of several hundred parts per million (ppm) in the solvent at room temperature conditions which could accumulate in the cylinder headspace after solvent and/or acetylene charge. The cylinders that are treated in this way may easily contain air impurities up to a few percent after the initial acetylene charge. This is not an issue for industrial grade acetylene.

Recently, acetylene has been used increasingly as a source material for depositing carbon and carbon-containing films in the electronic industry. Applications include the deposition of amorphous carbon hard mask films. High levels of atmospheric impurities or any other impurities in acetylene may reduce the film deposition rate and affect process uniformity and consistency. For such applications, less than about 100 parts per million (ppm), oftentimes less than about 10 ppm, of atmospheric impurities in acetylene may be desirable.

Therefore, a need exists for preparing acetylene cylinders for high purity acetylene storage, transport and/or delivery. Particularly, a need exists for preparing acetylene cylinders for use with high purity acetylene that can be used in the semiconductor industry. It would be desirable in the art to develop improved methods for preparing acetylene cylinders for high purity acetylene storage.

SUMMARY OF THE INVENTION

This invention relates in part to a method for preparing a pressure vessel for receiving high purity acetylene at elevated pressure, said method comprising:
providing a porous filler-containing pressure vessel;
deep cleaning the porous filler-containing pressure vessel;
purifying a solvent; and
charging the purified solvent into the deep cleaned, porous filler-containing pressure vessel to provide said pressure vessel.

This invention also relates in part to a method for charging a pressure vessel with high purity acetylene at elevated pressure, said method comprising:
providing a porous filler-containing pressure vessel;
deep cleaning the porous filler-containing pressure vessel;
purifying a solvent;
charging the purified solvent into the deep cleaned, porous filler-containing pressure vessel to provide said pressure vessel; and
charging said pressure vessel with high purity acetylene at elevated pressure.

This invention further relates in part to a method for storing, transporting and/or delivering high purity acetylene at elevated pressure in a pressure vessel, said method comprising:
providing a porous filler-containing pressure vessel;
deep cleaning the porous filler-containing pressure vessel;
purifying a solvent;
charging the purified solvent into the deep cleaned, porous filler-containing pressure vessel to provide said pressure vessel;
charging said pressure vessel with high purity acetylene at elevated pressure; and
storing, transporting and/or delivering said high purity acetylene at elevated pressure in said pressure vessel.

This invention further relates in part to a method for charging a pressure vessel with a solvent, said method comprising:
providing a vacuum container that contains said solvent;
optionally conducting at least one preliminary purification of said solvent, said preliminary purification being selected from membrane separation, sonication, sparging or displacing atmospheric impurities in said solvent using a gas selected from a hydrocarbon gas, helium, hydrogen, argon, or a combination thereof;
vacuum degassing the solvent in the vacuum container, said vacuum container containing said solvent and vapor space above said solvent;
applying a pressure, using a gas selected from a hydrocarbon gas, helium, hydrogen, argon, or a combination thereof, in the vapor space above the solvent in said vacuum container; and
charging said pressure vessel with said solvent from said vacuum container.

This invention also relates in part to a method for purifying a solvent comprising:
(a) optionally conducting at least one preliminary purification of said solvent, said preliminary purification being selected from membrane separation, sonication, sparging or displacing atmospheric impurities in said solvent using a gas selected from a hydrocarbon gas, helium, hydrogen, argon, or a combination thereof, and (b) vacuum degassing said solvent under conditions sufficient to remove the atmospheric impurities from said solvent; or
displacing atmospheric impurities in said solvent with a gas selected from a hydrocarbon gas, helium, hydrogen, argon, or a combination thereof.

This invention provides a number of advantages. The degassing of a solvent prior to charging the solvent into a cylinder overcomes the disadvantages of previously known techniques. The solvent degassing step is done prior to solvent charge, which makes it more efficient than cleaning a cylinder after non-degassed solvent has been introduced.

Solvent purification employing the vacuum degassing technique provides high efficiency with no introduction of any other contaminants. After the solvent has been vacuum degassed, the use of gas, e.g. acetylene, to pressurize the solvent vessel and allow for solvent charge to the acetylene cylinder further avoids contamination. Other physical means may be used to provide pressure in the vacuum tank. Another embodiment of solvent purification is to use a gas which is not considered as impurity, e.g. acetylene, to displace the dissolved gases in the solvent. The use of acetylene to displace dissolved gases in a solvent does not introduce any other impurities as occurs when other gases are used. The amount of acetylene needed to displace dissolved air prior to solvent charge in a cylinder can be significantly lower than that needed when acetylene is used to purge cylinders that have already been charged with non-degassed solvent.

DETAILED DESCRIPTION OF THE INVENTION

As indicated above, this invention relates in part to a method for preparing a pressure vessel for receiving high purity acetylene at elevated pressure, said method comprising:

providing a porous filler-containing pressure vessel;

deep cleaning the porous filler-containing pressure vessel;

purifying a solvent; and charging the purified solvent into the deep cleaned, porous filler-containing pressure vessel to provide said pressure vessel.

Figure 1:
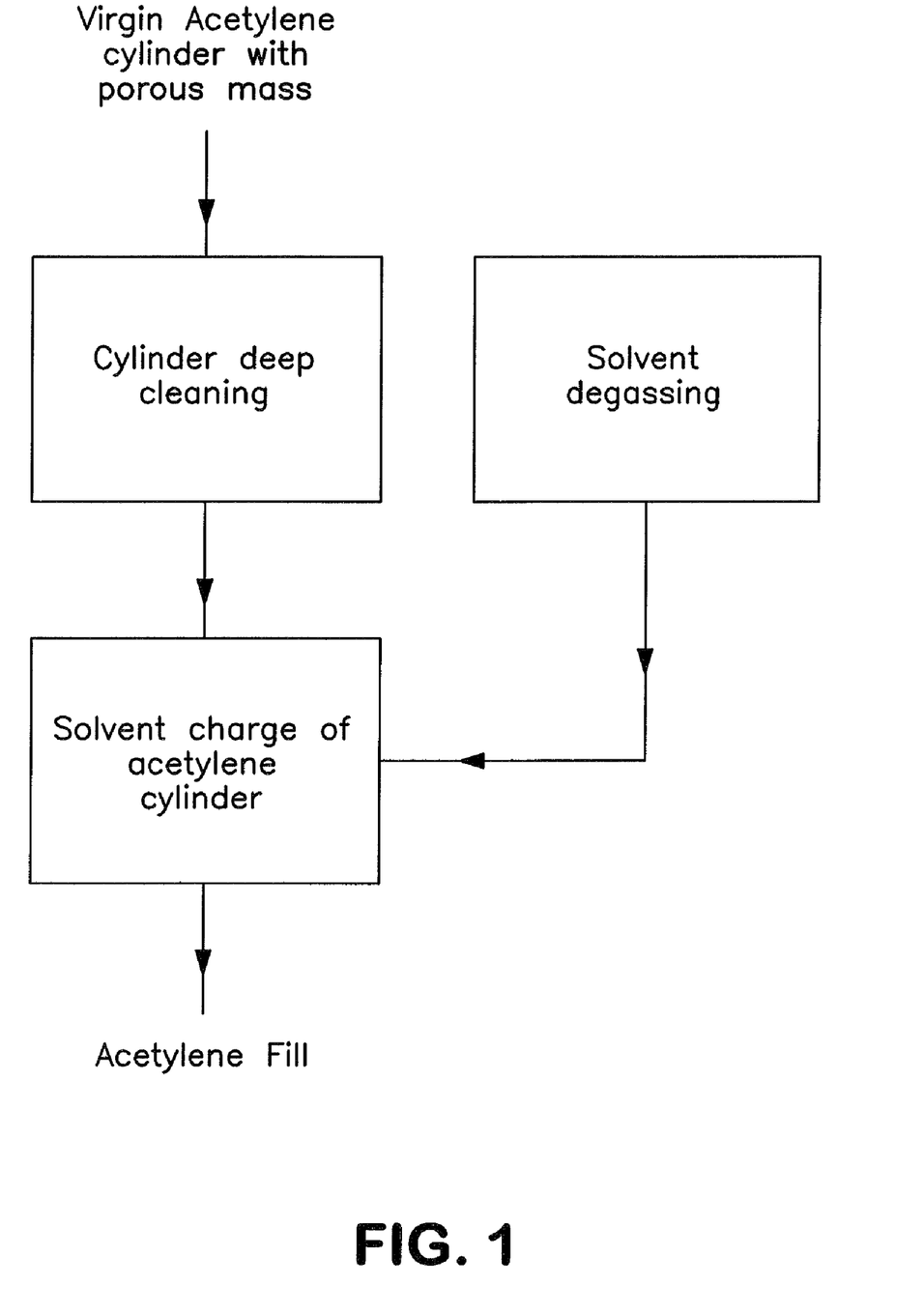
FIG. 1 is a schematic representation of high purity acetylene cylinder preparation.

In the practice of this invention, the acetylene cylinder is cleaned and the solvent is purified prior to charging the solvent into the acetylene cylinder. FIG. 1 provides a flow chart of the acetylene cylinder preparation process of this invention. As depicted in FIG. 1, cylinder cleaning and the solvent degassing process are conducted prior to charging the solvent into the acetylene cylinder.

The porous filler material in the pressure vessel can be any conventional material such as calcium silicate, diatomaceous earth or charcoal. The porous filler material can be used in conventional amounts as required for the particular acetylene cylinder. The porous filler typically has a porosity of around 90% by volume. As indicated above, the function of the porous filler is to separate acetylene into small units in the pores to help inhibit the decomposition of acetylene.

Cylinder deep cleaning prior to solvent charge may be done using any of the known processes, such as standard vacuum/purge cylinder cleaning procedure. See, for example, U.S. Pat. No. 4,863,493, the disclosure of which is incorporated herein by reference. The deep cleaning step may be carried out by first heating the cylinder to remove any moisture. The heating temperature can range from greater than about 100° C. to a temperature that does not adversely affect, e.g., decrease, the porosity of the porous filler material. Typically, such temperatures can range from greater than about 100° C. to about 250° C. depending on the type of porous filler material in the cylinder. If the porous filler material is calcium silicate, the temperature should be less than about 250° C. to prevent crystallization of the calcium silicate. The cylinder can be evacuated when heated, for example, the vacuum can be about 10 Torr or less, preferably about 1 Torr or less, more preferably about 0.1 Torr or less. The retention time of the heating/vacuum can range from about 0.5 hours or less to several hours, depending on the volume and type of porous filler material used in the cylinder and the degree of purity desired. When the cylinder is heated and evacuated to remove moisture, impurities such as nitrogen and oxygen can also be removed. Vacuum/purge cycles may be applied instead of vacuum only at elevated temperatures.

The deep cleaning step can be simplified by a vacuum/purge procedure at room or ambient temperature. For example, after the cylinder is evacuated, e.g., to a vacuum of about 10 Torr or less, preferably about 1 Torr or less, more preferably about 0.1 Torr or less, for a period of time from about 0.5 hours to about 10 hours, a purge gas can be charged into the cylinder. The purge gas can remain in the cylinder for a period of time, e.g., from about 0.5 hours to about 48 hours or so, before the cylinder is evacuated. Suitable purge gases include, for example, high purity helium, high purity hydrogen, high purity acetylene, and the like. Such purge gases should contain less than about 1000 ppm of impurities, preferably less than about 100 ppm of impurities, and more preferably less than about 10 ppm of impurities. The cylinder is then evacuated to a pressure of about 10 Torr or less, preferably about 1 Torr or less, more preferably about 0.1 Torr or less. The vacuum/purge steps can be repeated any number of times, depending on the volume and type of porous filler material used in the cylinder and the degree of cylinder purity desired.

The cylinder deep cleaning may be further simplified by using a vacuum procedure only at room or ambient temperature for a specified period of time. For example, the cylinder may be evacuated, e.g., to a vacuum of about 10 Torr or less, preferably about 1 Torr or less, more preferably about 0.1 Torr or less, for a period of time from about 1 hour to about 5 days or so.

Deep cleaning conditions, such as temperature, pressure, vacuum and cleaning time, may vary greatly, depending on the deep cleaning procedure, and any suitable combination of such conditions may be employed herein. The deep cleaning is carried out at a temperature, pressure and cleaning time sufficient to remove impurities from the cylinder, particularly impurity gases from the porous filler material. The deep cleaning temperature may range from about 0° C. to about 250° C., preferably from about 10° C. to about 150° C., and most preferably from about 10° C. to about 30° C. The deep cleaning pressure, e.g., purge pressure, may range from about 1 psig to about 250 psig, and preferably from about 20 psig to about 200 psig. The deep cleaning vacuum may be about 10 Torr or less, preferably about 1 Torr or less, and more preferably about 0.1 Torr or less. The deep cleaning time can range from about 0.5 hours to about 5 days or so, preferably from about 2 hours to about 3 days, and more preferably from about 8 hours to about 3 days. A deep cleaning time of from about 30 minutes to about 1 hour may be employed for some cylinders.

Solvent purification, e.g., solvent degassing, is important for obtaining high purity acetylene in the cylinder. Large amounts of atmospheric gases such as nitrogen, oxygen and carbon monoxide are typically dissolved in the solvent, e.g.

acetone, dimethylformamide (DMF) or N-methylpyrrolidone (NMP). For example, at 20° C. and 760 mm Hg, 100 grams of dimethylformamide (DMF) contains around 6 milliliters of nitrogen, 11.4 milliliters of oxygen, 11 milliliters of carbon monoxide and 5 milliliters of hydrogen. The solubility of these gases in acetone is similar to that in DMF. Therefore, if solvent containing these impurities is not degassed, the impurities will be charged into the acetylene cylinder during solvent fill. Even if the cylinders have been cleaned prior to solvent charge, newly employed acetylene cylinders filled with non-degassed solvent may contain over a thousand parts per million of atmospheric impurities. Acetylene may be used to purge the cylinders by repeatedly charging them with acetylene and venting. However, due to the porous mass inside the acetylene cylinder, a few days of settle time will be necessary to allow for these impurities to come out of the solvent prior to venting. Furthermore, the cost of the process is high, since it includes the cost of acetylene used for purging the cylinders as well as the labor cost for venting and recharging. In addition, for acetone-based cylinders, such charge/vent cycles will cause the cylinders to become depleted of acetone to the point where acetone may need to be added to the cylinders to meet minimum safety specifications. This process will, again, introduce impurities into the cylinders if the solvent is not degassed.

For other applications, solvent degassing is commonly done by sonication, by vacuum, by using gas permeable membranes, or by displacing atmospheric gases with other gases such as helium, which will not disturb the process or which have very low solubility in the solvent. Degassing by using sonication is good for small scale operations and is mainly used to remove gases adhered to the surface of equipment parts. Membrane separation has been widely used to remove air dissolved in water. The method does not introduce additional contaminants, but may not be adequate for very high purity requirements. Sparging using other gases, such as helium, is very efficient and is one of the most widely used degassing techniques. However, by using helium to displace air, helium itself will be introduced into the solvent. In electronic applications, any other gases in acetylene, including helium, would affect the carbon film deposition rate, and would therefore be considered as contaminants.

Vacuum degassing is an efficient technique for solvent purification with no introduction of contaminants. The solvents used for high purity acetylene cylinders may be purified using vacuum degassing techniques or vacuum degassing techniques combined with other common degassing techniques mentioned herein. Vacuum degassing of a solvent can be conducted in a vacuum container preferably at about the vapor pressure of the solvent. When vacuum degassing is used, the solvent, after the degas step, will be under vacuum conditions which makes it difficult to charge the acetylene cylinders. In this case, gases, e.g., acetylene, may be added to the headspace of the vessel to provide sufficient head pressure for the solvent to be charged to the acetylene cylinder. Another embodiment involves the use of hydrocarbons, e.g., acetylene, to displace the dissolved gases in the solvent. This method eliminates the introduction of additional contaminants.

Therefore, preferably, the solvent degassing step may be conducted using vacuum degassing followed by the use of acetylene to increase the pressure in the vacuum tank to support solvent charge of the acetylene cylinder. Since solvents used for acetylene cylinders have high vapor pressures, carry-over solvent vapor during the vacuum process cannot be ignored. Vacuum degassing may be done at low temperatures to reduce carry-over of solvent. This will add extra cost and reduce efficiency. In order to minimize carry-over solvent, a "freeze-pump-thaw" method may also be applied. However, the processes of "freeze" and "thaw" take a long time. For example, it takes around 1.5 hours for 2 kilograms of DMF in a 1 gallon stainless steel container to freeze in a dry ice/acetone cold trap. It then takes another 4 hours for the temperature of DMF to increase from −61° C. to 5° C. at room temperature. In addition to the long duration, the setup for the "freeze-pump-thaw" technique is expensive and the operation is complicated, especially for large throughputs. Therefore, the preferred method is to vacuum degas solvent at room temperature and to apply a cold trap and/or adsorbent materials to recover carry-over solvent. In this embodiment, the preferred vacuum degassing may be conducted at a temperature and vacuum where the solvent is maintained in the liquid phase. Further, the preferred temperature may be room temperature and a preferred pressure may be chosen close to the solvent vapor pressure. For example, the preferred vacuum for vacuum degassing DMF at room temperature is about 3 Torr.

The efficiency of vacuum degassing may be enhanced by circulating the solvent, e.g., by using an agitator, or by using splash or spray type circulation equipment. Even though vacuum degassing is efficient with no introduction of contaminants, it poses an issue for filling acetylene cylinders. When vacuum degassing is applied, the solvent is under vacuum condition after degassing. Since the vacuum tank is sealed, when the solvent is pumped from the vacuum tank to acetylene cylinder, the pressure in the vacuum tank decreases. Typically it takes only 15 minutes or so to pump around 60 pounds of DMF into an acetylene cylinder. Therefore, the pressure in vacuum tank drops so fast that the vaporization of the solvent in the tank is not fast enough to compensate for the pressure change associated with removing liquid from the tank. This would create difficulties for a solvent pump to transfer the solvent into acetylene cylinders. For example, a typical diaphragm pump requires around 30 Torr or above pressure in the vacuum tank in order to efficiently pump DMF from the vacuum tank into acetylene cylinders. In order to increase and maintain the pressure in the vacuum tank to support the solvent charge of acetylene cylinders, the solvent in the tank may be physically compressed. Gases with low solubility in the solvent may also be used to maintain the tank pressure. By doing this, a small amount of helium or hydrogen will dissolve in the solvent. The helium or hydrogen in acetylene cylinders may be removed by venting some of the gases in the cylinder. An easier way to maintain the pressure of the vacuum tank without introducing contamination is to use a gas which would not create an impurity issue, such as acetylene, other hydrocarbons, and the like, to form a blanket on top of the solvent. The pressure of the blanket should be greater than the vapor pressure of the solvent.

The solvent degassing step may be conducted using one or more degassing methods. The solubility of oxygen and nitrogen in solvents is usually very high, and it can take a relatively long time to reduce dissolved air by using vacuum degassing only. In order to increase throughput without increasing cost, vacuum degassing may be combined with other degassing techniques. The majority of the dissolved air may be removed by using a preliminary purification method and then the remaining trace dissolved air and/or other contaminations introduced by the first method may be reduced by using vacuum degassing. The preliminary method can be any of the known degassing methods, such as by using membrane separation, sonication, by using other gases to displace the dissolved air (e.g., sparging), vacuum degassing, and the like. In the preliminary method, if other gases are used to purify the solvent, it is preferred that any gas which has lower solubility in the solvent than that of oxygen and nitrogen may be used to displace dissolved air. Such gases include helium, hydrogen, and the like. The setup using other gases to displace air is very simple and inexpensive. The preliminary purification method can use gases such as helium, hydrogen, a hydrocarbon gas (e.g., acetylene, ethylene, and the like), argon or combinations thereof, to displace atmospheric impurities from the solvent.

Figure 3:
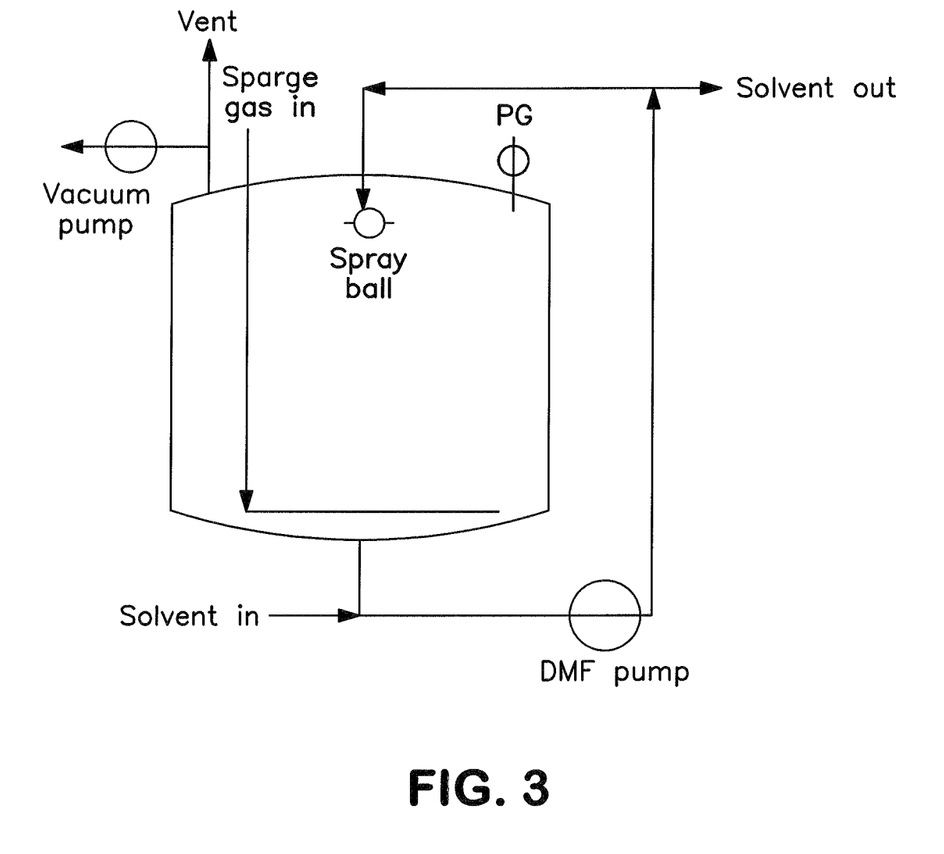
FIG. 3 is a schematic representation of a sparge degassing system.
Figure 4:
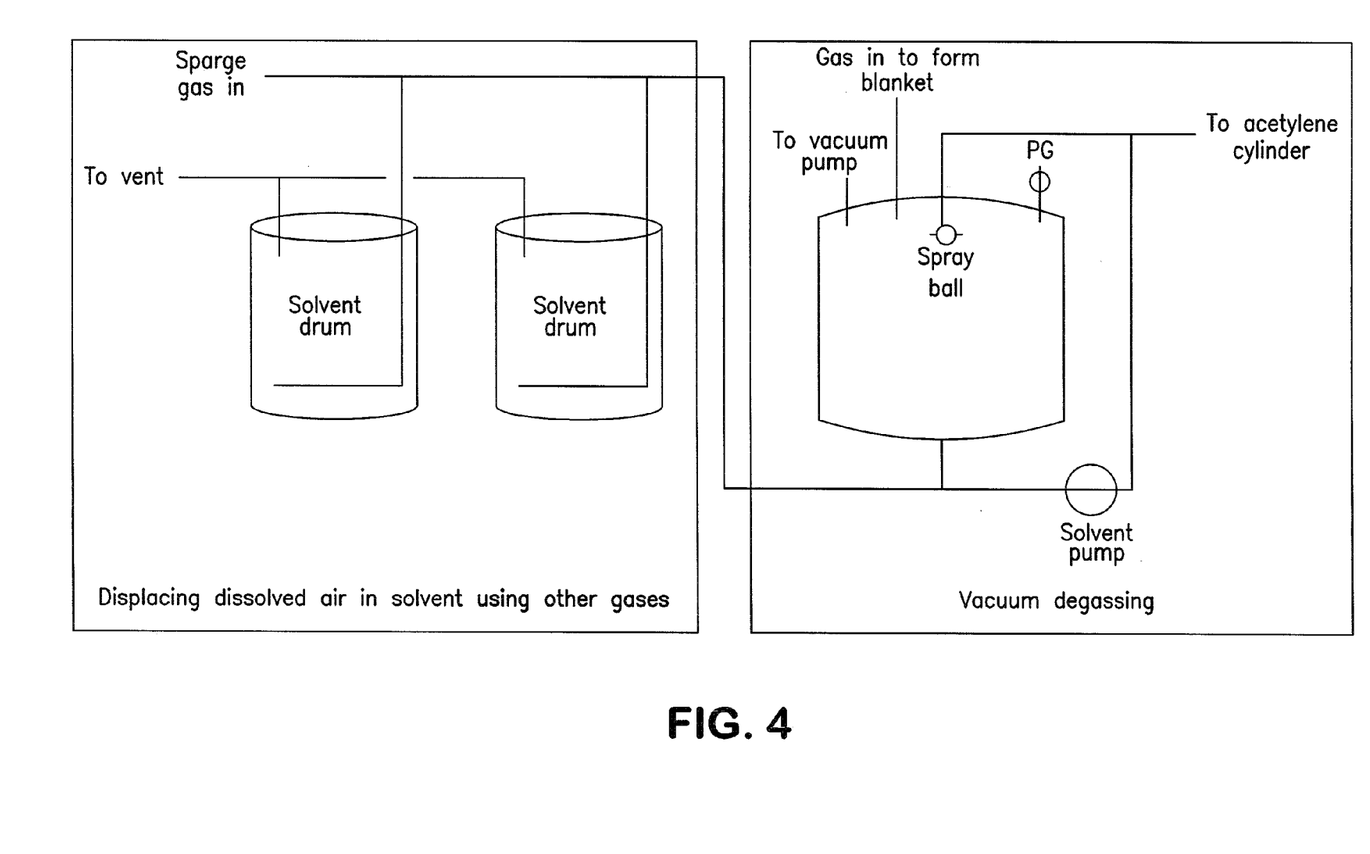
FIG. 4 is a schematic representation of a solvent degassing system in which both sparge and vacuum degassing techniques are utilized.

An example of the dual solvent purification system is shown in FIG. 4. The solvent may be sparged using helium. The original solvent drum itself may be used as a sparging container with a diptube inserted. Several drums may be sparged simultaneously. After helium sparging is done, the solvent may be transferred to the vacuum tank for removal of dissolved helium by using vacuum degassing. The sparging and vacuuming may be done in one container as shown in FIG. 3. Since the solubility of helium in solvents (such as DMF, NMP or acetone) is much lower than that for nitrogen and oxygen, it would take less time to reduce dissolved helium by using vacuum degassing, which consequently increases the throughput of the vacuum degassing system. The gas may be used to directly sparge the solvent in a drum or container by using a diptube. In order to further increase the efficiency and maximize the dispersion of one phase in another, a column equipped with trays, packings, or mechanical internals may be used. Even a spray column, which contains no internals, can be used. When a packed bed is used, the feed of gas may pass upward through the bed in a countercurrent direction to the descending solvent, which enters in the top portion of the bed.

As indicated above, this invention relates in part to a method for charging a pressure vessel with a solvent, said method comprising:

providing a vacuum container that contains said solvent;

optionally conducting at least one preliminary purification of said solvent, said preliminary purification being selected from membrane separation, sonication, sparging or displacing atmospheric impurities in said solvent using a gas selected from a hydrocarbon gas, helium, hydrogen, argon, or a combination thereof;

vacuum degassing the solvent in the vacuum container, said vacuum container containing said solvent and vapor space above said solvent;

applying a pressure, using a gas selected from a hydrocarbon gas, helium, hydrogen, argon, or a combination thereof, in the vapor space above the solvent in said vacuum container; and charging said pressure vessel with said solvent from said vacuum container.

In another alternative embodiment, in order to make the degassing process even simpler, gases which would not cause impurity issues, such as acetylene, hydrocarbons and the like, may be used to displace air in the solvent prior to solvent charge of acetylene cylinder. First, the technique utilizes the advantages of displacing air in solvent with other gases but without introducing extra contaminants as with other gases, such as helium. Second, the process is very simple and setup is much less expensive than other techniques. Third, the process can be a batch or continuous process. Fourth, the process is very flexible and can be easily set up for both large and small scale. The gas may be used to directly sparge the solvent in a drum or container, for example, by using a diptube. When acetylene is used, effluent acetylene from degas system may be circulated back to acetylene production line and reused as industry grade acetylene. The gas may be used to directly sparge the solvent in a drum or container by using a diptube. In order to further increase the efficiency and maximize the dispersion of one phase in another, a column equipped with trays, packings, or mechanical internals may be used. Even a spray column, which contains no internals, can be used. When a packed bed is used, the feed of gas may pass upward through the bed in a countercurrent direction to the descending solvent, which enters in the top portion of the bed. One example of using acetylene to degas solvent is shown in FIG. 3 in which solvent circulation through a spray ball was used to enhance the degassing efficiency. A cold trap and/or a filtration bed may be used to collect carry-over solvent.

Figure 5:
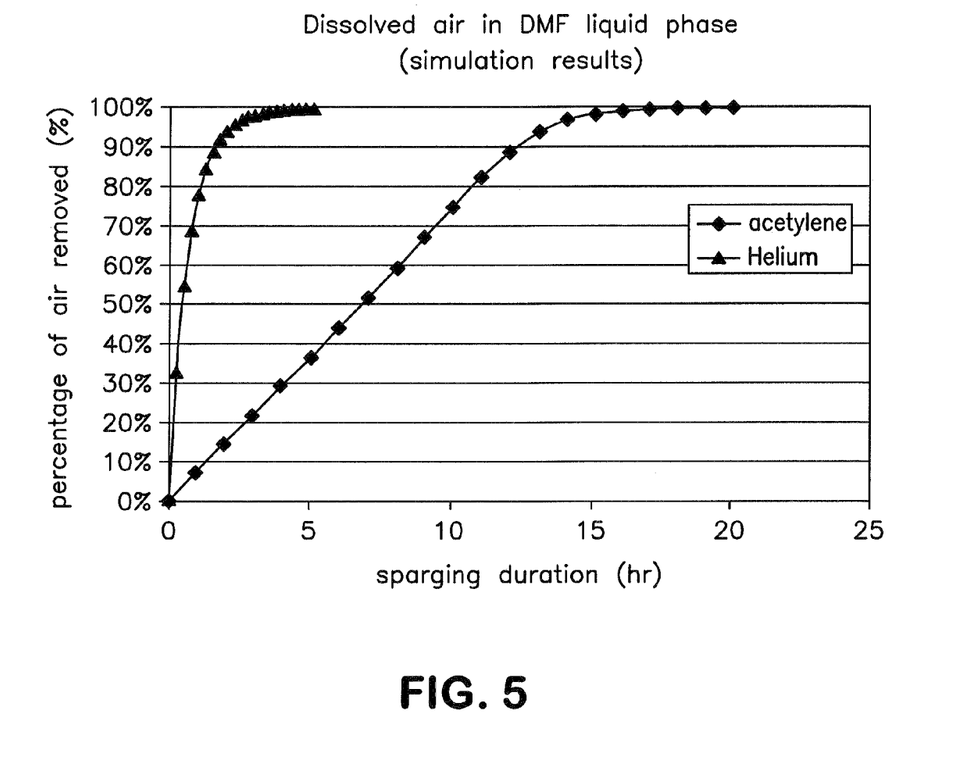
FIG. 5 graphically depicts simulation results for dissolved air removed by using acetylene or helium sparging at a flow rate of 2 liters/minute.

Since the solubility of acetylene in the solvent is much higher than that of helium, using acetylene to displace atmospheric impurities in solvent will take a longer time than when helium is used at the same flow rate. A simulation result of dissolved air removal by using helium and acetylene sparging at a flow rate of 2 liters/minute is shown in FIG. 5. It is noted that the simulation result shows the concentration of dissolved air in the liquid solvent. The longer degassing time when using acetylene is due to the majority of the acetylene becoming initially dissolved in the solvent instead of acting to sparge the solvent. Only after the solvent is saturated with acetylene will sparging take place. The time to degas using acetylene may be easily reduced by increasing the initial acetylene flow to have the solvent saturated in a reduced time.

Acetylene which is used to displace air in the solvent may be replaced with other gases if those gases would not affect the application of high purity acetylene. The preferred candidate may be any hydrocarbon since some hydrocarbons mix very well with acetylene in both the gas phase and in the solvent. In such cases, the effluent gases from the cylinder may still have a relatively constant concentration which might not affect the consistency of the film deposition rate. For example, ethylene may be used to displace air in solvent. The benefit of using ethylene is that this gas is easier to handle than acetylene.

Since the degassing was done under pressure, the solvent may be directly charged into the acetylene cylinder without the need of pressurized blanket on top of the solvent as that when vacuum degassing is used. If desired, the gas which was used to displace air may be used to maintain a constant pressure inside the solvent container during solvent charge of acetylene cylinder.

As indicated above, this invention relates in part to a method for purifying a solvent comprising:

optionally conducting at least one preliminary purification of said solvent, said preliminary purification being selected from membrane separation, sonication, sparging or displacing atmospheric impurities in said solvent using a gas selected from a hydrocarbon gas, helium, hydrogen, argon, or a combination thereof, and (b) vacuum degassing said solvent under conditions sufficient to remove the atmospheric impurities from said solvent; or displacing (e.g., sparging) atmospheric impurities in said solvent with a gas selected from a hydrocarbon gas, helium, hydrogen, argon, or a combination thereof.

Solvent purification conditions, such as temperature, pressure and cleaning time, may also vary greatly, depending on the purification procedure, and any suitable combination of such conditions may be employed herein. The purification conditions should be sufficient to remove impurities, e.g., dissolved gases, from the solvent. The purification temperature may range from about −80° C. to about 60° C., preferably from about 0° C. to about 30° C. The purifier vacuum may range from about 0.001 Torr to about 250 Torr, preferably from about 0.1 Torr to about 50 Torr, most preferably about the vapor pressure of the solvent. The purification pressure may range from about 1 psig to about 250 psig, preferably from about 1 psig to about 100 psig, and most preferably from about 5 psig to about 40 psig. The purification time can range from about 30 minutes to about 48 hours or so, preferably from about 1 hour to about 24 hours, and more preferably from about 2 hours to 12 hours.

The high purity acetylene can be charged into the treated cylinder by methods mentioned above. The pressure vessel is preferably a gas cylinder, although other shapes of the vessel may be used. The pressure vessel can be charged with high purity acetylene under pressure by conventional methods. The quality and purity of the high purity acetylene are maintained when the high purity acetylene is charged into the treated cylinder.

As indicated above, this invention relates in part to a method for charging a pressure vessel with high purity acetylene at elevated pressure, said method comprising:

providing a porous filler-containing pressure vessel;
deep cleaning the porous filler-containing pressure vessel;
purifying a solvent;
charging the purified solvent into the deep cleaned, porous filler-containing pressure vessel to provide said pressure vessel; and
charging said pressure vessel with high purity acetylene at elevated pressure.

The storage, transport and/or delivery pressure of a fully charged vessel can range from about 200 psig to about 400 psig. This invention relates to a pressure vessel for storage, transport and/or delivery of high purity acetylene under pressure, said pressure vessel prepared as described herein.

As indicated above, this invention relates to a method for storing, transporting and/or delivering high purity acetylene at elevated pressure in a pressure vessel, said method comprising:

providing a porous filler-containing pressure vessel;
deep cleaning the porous filler-containing pressure vessel;
purifying a solvent;
charging the purified solvent into the deep cleaned, porous filler-containing pressure vessel to provide said pressure vessel;
charging said pressure vessel with high purity acetylene at elevated pressure; and
storing, transporting and/or delivering said high purity acetylene at elevated pressure in said pressure vessel.

The high purity acetylene is useful in semiconductor applications and can also be provided to a work device for use in depositing carbon and carbon-containing films, tubes, fiber, and the like. For the semiconductor applications, the high purity acetylene has less than about 1000 parts per million of atmospheric impurities, preferably less than about 100 parts per million of atmospheric impurities, and more preferably less than about 10 parts per million of atmospheric impurities.

Various modifications and variations of this invention will be obvious to a worker skilled in the art and it is to be understood that such modifications and variations are to be included within the purview of this application and the spirit and scope of the claims.

In the examples below, DMF was used as the solvent. The DMF degassing was conducted by using various methods. Except as otherwise noted, in all cases, after degassing was completed, a 2 kilogram DMF sample was pulled into a deep vacuum cleaned 1 gallon ampoule. The ampoule was pressurized to 100 psig using helium for test purposes. The concentration of oxygen and nitrogen in the gas phase in the ampoule was tested using a gas chromatograph (GC) after allowing the ampoule to sit for 24 hours. Even though the dissolved gases in the liquid phase were not tested directly, the test on the gas phase of the samples provides a good indication of the level of the dissolved gases in the liquid phase. When dissolved helium was to be tested, nitrogen gas was used to pressurize the ampoules to 100 psig instead of helium.

EXAMPLE 1

Figure 2:
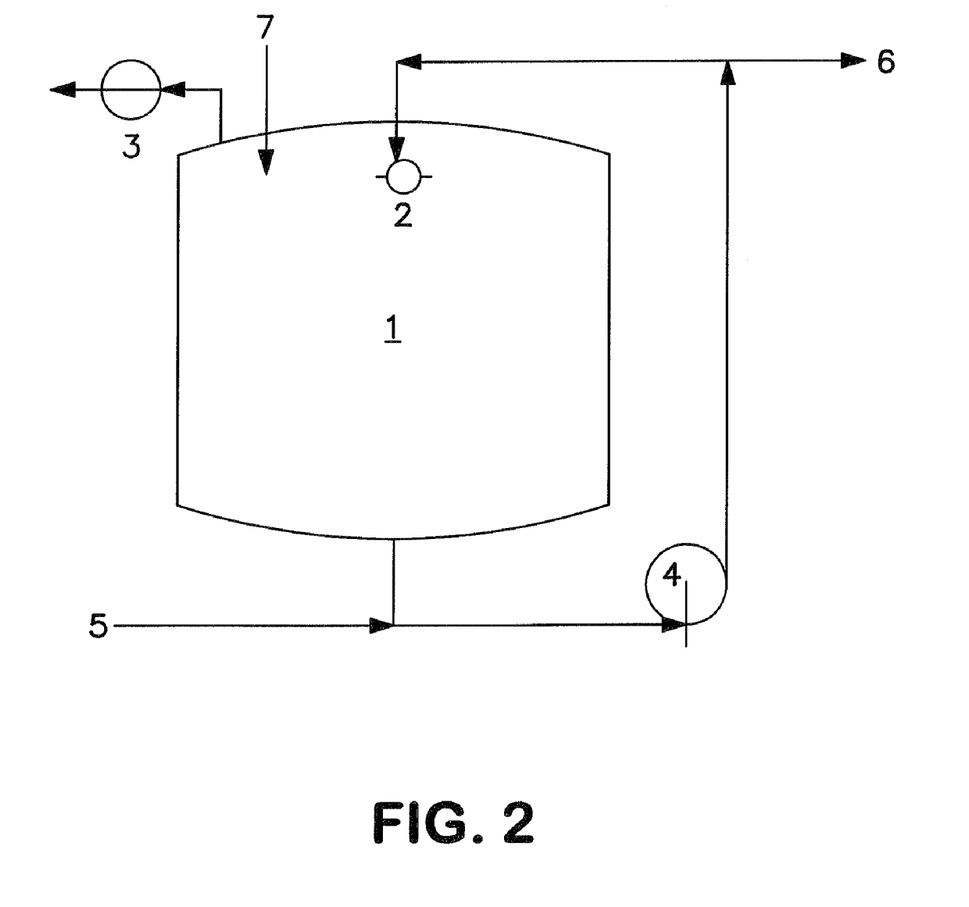
FIG. 2 is a schematic representation of a vacuum degassing system.

Vacuum degassing was tested at room temperature. FIG. 2 depicts a vacuum degassing system used for the test. A 60 gallon vacuum tank 1 was equipped with a spray ball 2. The tank 1 was vacuumed down to less than 5 Torr prior to solvent charge through vacuum pump 3. The vacuum pump was then stopped and 55 gallons of DMF was charged into the tank through inlet port 5. The degassing was done by vacuuming the tank while keeping DMF circulating from the bottom of the tank 1 through spray ball 2 by using DMF pump 4. The tank pressure was less than 5 torr during the degassing process. The vacuum degassing was conducted for 3, 4, 5 and 6 hours, respectively. The samples were removed via line 6. The results are shown in Table 1 below. The 0 hour sample was taken after DMF was charged into the tank 1 but before the vacuum and DMF pumps were turned on for degassing.

TABLE 1

| Vacuuming Duration (hr) | $O_2$ (ppm) | $N_2$ (ppm) |
|---|---|---|
| 0 | 1255 | 1975 |
| 3 | 165 | 131 |
| 4 | 108 | 97 |
| 5 | 40 | 29 |
| 6 | 32 | 29 |

In order to charge the solvent efficiently to acetylene cylinders after vacuum degassing, pressure in tank 1 may be increased by forming an acetylene blanket through line 7. Other gases may be used for this purpose.

EXAMPLE 2

Approximately 55 gallons of DMF in a 60 gallon tank was sparged using helium. An L type diptube with a number of holes on the horizontal line was used as a sparging tube. The sparge degassing system is shown in FIG. 3. The results show that nitrogen gas in the gas phase in the ampoule is reduced from about 2000 ppm with no sparging to less than 10 ppm with 30 hours helium sparging at a helium flow rate as low as 200 sccm. The sparging time can be reduced by increasing helium flow rate. For example, nitrogen gas can be reduced to about 10 ppm in 15 hours with a helium flow rate of 1 liter/minute. In order to further increase the sparging efficiency, DMF may be circulated during sparging. Table 2 shows the results at a helium flow rate of 2 liters/minute with/without DMF circulation. It shows sparging duration can be reduced by almost half when DMF is circulated.

TABLE 2

| Sparging time | No DMF circulation | | With DMF circulation | |
|---|---|---|---|---|
| (hr) | $O_2$ (ppm) | $N_2$ (ppm) | $O_2$ (ppm) | $N_2$ (ppm) |
| 0.5 | — | — | 430 | 338 |
| 1 | — | — | 243 | 180 |
| 2 | — | — | 98 | 66 |
| 3 | — | — | 36 | 22 |
| 4 | 104 | 92 | — | — |
| 5 | 49 | 46 | — | — |

After 3 hours helium sparging at a helium flow rate of 2 liters/minute with DMF circulation, the level of oxygen and nitrogen impurities in DMF was lowered to a similar level to that when vacuum degassing is used for 5 to 6 hours. Since many drums can be easily sparged simultaneously, the throughput can be increased without adding too much cost by simply using helium sparging first.

EXAMPLE 3

After helium sparging, a vacuum degassing technique was applied to remove dissolved helium from the solvent. The vacuum degassing had the same setup and conditions as in Example 1 and shown in FIG. 2. The DMF was from Example 2, which was sparged using helium at 2 liters/minute with DMF circulation for 3 hours. The results are shown in Table 3. Dissolved helium was completely removed after 2 hours vacuum at 3 Torr.

TABLE 3

| Vacuuming Duration (hr) | Helium (ppm) |
|---|---|
| 0 | 1270 |
| 0.5 | 137 |
| 1 | 81 |
| 2 | <1 |
| 3 | <1 |

Therefore, by combining helium sparging and vacuum degassing, a large throughput of solvent degassing can be achieved at low cost. For example, when vacuum degassing only is applied, with one 60 gallon vacuum tank, it would take 12 hours in order for dissolved air in two (2) 55 gallon drums of DMF to be reduced to less than 3% ( gas phase sample) using a 6 hour vacuum per drum. When vacuum degassing is combined with helium sparging, only 7 hours are required to get the dissolved air in two (2) 55 gallon drums of DMF to less than 3%—3 hours for helium to sparge the 2 drums simultaneously plus 4 hours vacuum degassing (2 hours to remove dissolved helium in each drum). The setup is illustrated in FIG. 4.

EXAMPLE 4

Fifteen A420 acetylene cylinders containing porous filler were vacuum cleaned on a manifold rack at 1.6 Torr for a period of 48 hours. Then 7 of the acetylene cylinders were filled with non-cleaned DMF and 8 of the acetylene cylinders were filled with degassed DMF. The DMF degassing was done by vacuuming only at 2.5 Torr for a period of 6 hours. Then each of the 15 cylinders were charged with acetylene. The total atmospheric impurities ($N_2$, $O_2$, CO, $CO_2$) in the cylinders were analyzed by GC after the cylinders were allowed to settle for 4 days. The pressure of the cylinders was in the range of 230 to 240 psig at 70° F. The results are given in Table 4 below. $CO_2$ was non-detectable.

TABLE 4

| | (units in ppm) | | |
|---|---|---|---|
| | Non-degassed DMF | | |
| Cyl# | $N_2$ | $O_2$/Ar | CO |
| Cyl# 1 | 41000 | 8100 | 3 |
| Cyl# 2 | 38000 | 6400 | 13 |
| Cyl# 3 | 92000 | 14950 | 20 |
| Cyl# 4 | 108500 | 17000 | 20 |
| Cyl# 5 | 40000 | 6700 | 10 |
| Cyl# 6 | 19500 | 2575 | 3 |
| Cyl# 7 | 9700 | 700 | <1 |
| | Degassed DMF | | |
| Cyl# | $N_2$ | $O_2$ | CO |
| Cyl# 8 | 73 | 8 | <1 |
| Cyl# 9 | 78 | 10 | <1 |
| Cyl# 10 | 58 | 3 | <1 |
| Cyl# 11 | 30 | 1 | <1 |
| Cyl# 12 | 12 | 1 | <1 |
| Cyl# 13 | 25 | 1 | <1 |
| Cyl# 14 | 65 | 14 | <1 |
| Cyl# 15 | 50 | 8 | <1 |

The invention claimed is:

1. A method for preparing a pressure vessel for receiving high purity acetylene at elevated pressure, said method comprising: providing a porous filler-containing pressure vessel; deep cleaning the porous filler-containing pressure vessel; purifying a solvent; and charging the purified solvent into the deep cleaned, porous filler-containing pressure vessel to provide said pressure vessel; and wherein purifying said solvent comprises vacuum degassing said solvent in a vacuum container, said vacuum container containing said solvent and vapor space above said solvent.

2. The method of claim 1 wherein charging the purified solvent into the deep cleaned, porous filler-containing pressure vessel comprises applying a pressure, using a gas selected from a hydrocarbon gas, helium, hydrogen, argon or combinations thereof, in the vapor space above the solvent in said vacuum container.

3. The method of claim 2 wherein the hydrocarbon gas is acetylene.

4. The method of claim 2 further comprising applying said pressure, using a gas selected from a hydrocarbon gas, helium, hydrogen, argon or combinations thereof, greater than the vapor pressure of said solvent, in the vapor space above the solvent in said vacuum container.

5. The method of claim 1 wherein purifying said solvent comprises sparging or displacing atmospheric impurities in said solvent using a gas selected from a hydrocarbon gas, helium, hydrogen, argon, or a combination thereof.

6. The method of claim 1 wherein deep cleaning the porous filler-containing pressure vessel is carried out at a temperature, pressure and cleaning time sufficient to remove impurities from the pressure vessel.

7. The method of claim 1 wherein purifying said solvent is carried out at a temperature, pressure and purification time sufficient to remove impurities from said solvent.

8. The method of claim 1 wherein purifying said solvent by vacuum degassing involves circulating the solvent.

9. The method of claim 1 wherein the solvent comprises acetone, dimethylformamide (DMF) or N-methylpyrrolidone (NMP), and the pressure vessel comprises a cylinder.

10. A method for preparing a pressure vessel for receiving high purity acetylene at elevated pressure, said method comprising:
providing a porous filler-containing pressure vessel;
deep cleaning the porous filler-containing pressure vessel;
purifying a solvent; wherein purifying said solvent comprises (i) optionally conducting at least one preliminary purification of said solvent, said preliminary purification being selected from membrane separation, sonication, sparging or displacing atmospheric impurities in said solvent using a gas selected from a hydrocarbon gas, helium, hydrogen, argon, or a combination thereof, and (ii) vacuum degassing the solvent in a vacuum container, said vacuum container containing said solvent and vapor space above said solvent; and charging the purified solvent into the deep cleaned, porous filler-containing pressure vessel to provide said pressure vessel.

11. The method of claim 10 wherein charging the purified solvent into the deep cleaned, porous filler-containing pressure vessel comprises applying a pressure, using a gas selected from a hydrocarbon gas, helium, hydrogen, argon or a combination thereof, in the vapor space above the solvent in said vacuum container.

12. The method of claim 10 wherein purifying said solvent comprises (i) sparging or displacing atmospheric impurities in said solvent using a gas selected from a hydrocarbon gas, helium, hydrogen, argon, or a combination thereof, and (ii) vacuum degassing the solvent in a vacuum container, said vacuum container containing said solvent and vapor space above said solvent.

13. The method of claim 12 wherein charging the purified solvent into the deep cleaned, porous filler-containing pressure vessel comprises applying a pressure, using a gas selected from a hydrocarbon gas, helium, hydrogen, argon or a combination thereof, in the vapor space above the solvent in said vacuum container.

* * * * *